U S010348384B1

United States Patent
Ni et al.

(10) Patent No.: US 10,348,384 B1
(45) Date of Patent: Jul. 9, 2019

(54) METHOD AND APPARATUS FOR DETERMINING CHANNEL STATE INFORMATION (CSI) IN A MULTIPLE INPUT/MULTIPLE OUTPUT (MIMO) WIRELESS COMMUNICATION SYSTEM

(71) Applicant: Hong Kong Applied Science and Technology Research Institute Co., Ltd., Shatin, NT (HK)

(72) Inventors: Jia Ni, Shatin (HK); Yuxian Zhang, Fanling (HK); Mai Wai Kwan, Shatin (HK); Kong Chau Tsang, Kowloon (HK)

(73) Assignee: Hong Kong Applied Science and Technology Research Institute Company, Limited, Shatin, N.T. (HK)

( * ) Notice: Subject to any disclaimer, the term of this patent is extended or adjusted under 35 U.S.C. 154(b) by 0 days.

(21) Appl. No.: 15/904,325

(22) Filed: Feb. 24, 2018

(51) Int. Cl.
*H04B 7/06* (2006.01)
*H04B 7/0456* (2017.01)
*G06F 17/14* (2006.01)

(52) U.S. Cl.
CPC ......... *H04B 7/0626* (2013.01); *H04B 7/0486* (2013.01); *H04B 7/0639* (2013.01); *G06F 17/141* (2013.01)

(58) Field of Classification Search
CPC .. H04B 7/0626; H04B 7/0486; H04B 7/0639; G06F 17/141
See application file for complete search history.

(56) References Cited

U.S. PATENT DOCUMENTS

| | | | |
|---|---|---|---|
| 2012/0076028 A1* | 3/2012 | Ko | H04L 1/0026 370/252 |
| 2012/0320783 A1 | 12/2012 | Wu et al. | |
| 2013/0315284 A1 | 11/2013 | Nammie | |
| 2016/0080052 A1* | 3/2016 | Li | H04B 7/0456 375/267 |
| 2017/0264349 A1 | 9/2017 | Kant et al. | |

(Continued)

FOREIGN PATENT DOCUMENTS

| | | |
|---|---|---|
| CN | 101626266 A | 1/2010 |
| CN | 103155624 A | 6/2013 |

(Continued)

OTHER PUBLICATIONS

International Search Report ; PCT/CN2018/078465; pp. 1-10; dated Nov. 27, 2018.

*Primary Examiner* — Duc C Ho

(57) ABSTRACT

Provided is a method of determining Channel State Information (CSI) in a multiple input/multiple output (MIMO) wireless communication system. The CSI may comprise a Precoding Matrix Indicator (PMI) and/or a Rank Indicator (RI). The method comprises, for a matrix of channels comprising a link between a gNodeB (gNB) and a user equipment (UE), determining correlation values between all Discrete Fourier Transform (DFT) vectors and the observations from the channel matrix. The DFT vectors may include the horizontal vector direction and the vertical vector direction. The method includes selecting those DFT vectors in one or more selected vector directions having a correlation value greater than a predefined threshold to thereby identify a subset of all DFT vectors and determining said CSI from the selected subset of DFT vectors.

20 Claims, 7 Drawing Sheets

(56) References Cited

U.S. PATENT DOCUMENTS

2018/0091272 A1\* 3/2018 Wang ................... H04B 7/0417
2018/0205395 A1\* 7/2018 Nammi ............. H03M 13/2906

FOREIGN PATENT DOCUMENTS

| CN | 103401594 | | 11/2013 |
| --- | --- | --- | --- |
| CN | 104426635 | A | 3/2015 |
| CN | 104737464 | A | 6/2015 |
| CN | 107113040 | A | 8/2017 |

\* cited by examiner

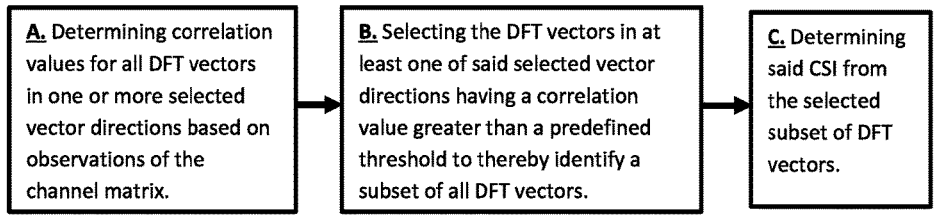
Fig 1A
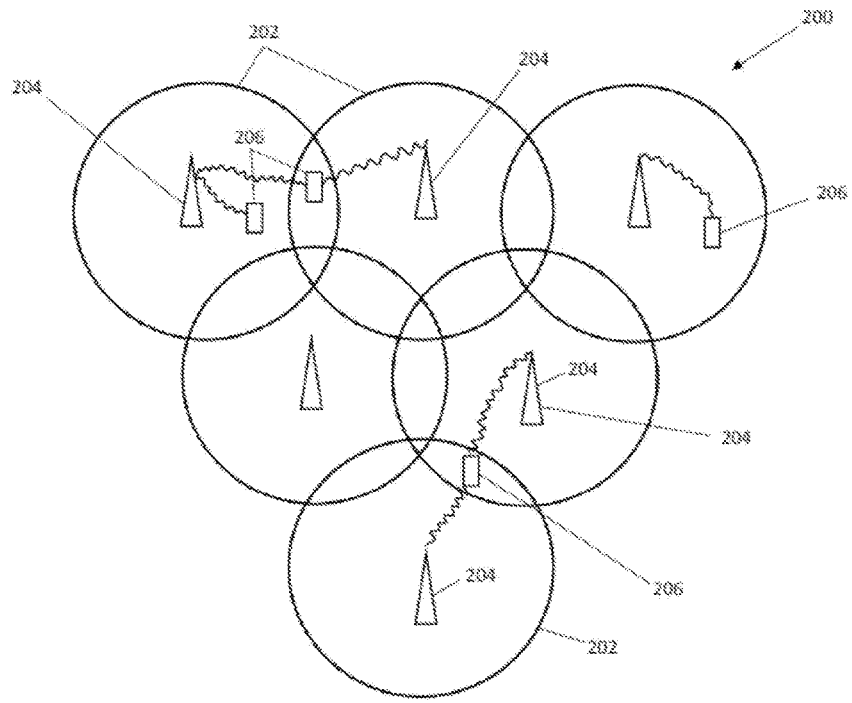
Figure 2
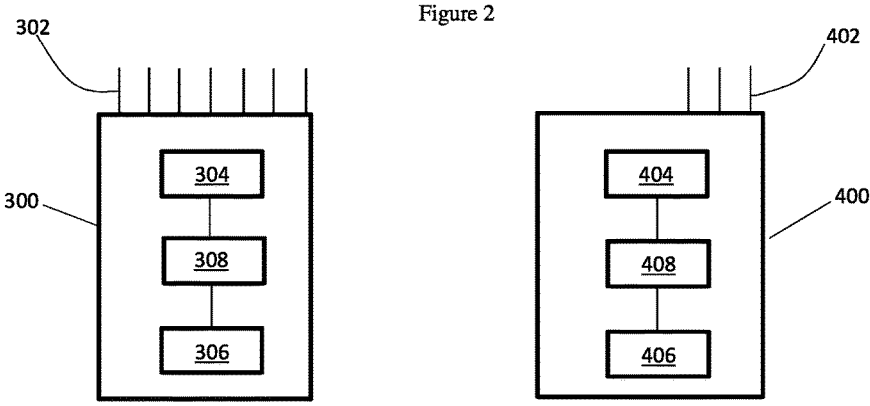
Fig. 3                    Fig. 4

| | Type I Single Panel |
|---|---|
| Computation complexity for exhaustive search | 1024 for ranks 1 and 5-8, 2048 for rank2, 1024 for ranks 3-4 |
| Computation complexity for proposed scheme | 68 for ranks 1 and 5-8, 258 for rank2, 258 for ranks 3-4 (Need to calculate the correlation b/t channel matrix and 16 DFT vectors for deriving the reduced search space) |
| Computation complexity Reduction | 87.75% |
| Note: assume the threshold reduced the 50% percentile of the search DFT vectors | |

Fig. 13

METHOD AND APPARATUS FOR DETERMINING CHANNEL STATE INFORMATION (CSI) IN A MULTIPLE INPUT/MULTIPLE OUTPUT (MIMO) WIRELESS COMMUNICATION SYSTEM

FIELD OF THE INVENTION

The invention relates to a method and apparatus for determining Channel State Information (CSI) in a multiple input/multiple output (MIMO) wireless communication system and, more especially, in a massive MIMO wireless communication system. The invention is directed particularly, but not exclusively, to providing a reduction in the computational complexity for deriving a Precoding Matrix Indicator (PMI) and/or a Rank Indicator (RI) in a Fifth Generation (5G) New Radio (NR) wireless communication system.

BACKGROUND OF THE INVENTION

Wireless communication networks such as Fourth Generation (4G, also referred to as Long Term Evolution (LTE)) networks are presently widely deployed to provide various telecommunication services such as telephony, video, data, messaging, and broadcasts. However, whilst current 4G technology offers much faster data rates than its previous generations, it has limitations due to its bandwidth, scalability and number of users under individual cells.

The NR standard for 5G networks has been developed and is being rolled out to provide new functionalities including enabling the connection of many things in, for example, the Internet of Things (IoT) with low latency and very greatly increased speeds. NR builds upon today's LTE networks, expanding and improving existing coverage with the goal to facilitate enhanced mobile broadband by using 5G small cells to boost the data rates on an LTE anchor network. Consequently, the 5G Radio Access architecture is composed of LTE Evolution and an NR Access Technology operable from about 1 GHz to about 100 GHz.

MIMO antenna technology has matured for wireless communication systems and has been incorporated into wireless broadband standards such as LTE, Wi-Fi and now NR. Basically, the more antennas that the transmitter/receiver is equipped with, the greater the possible signal paths and the better the performance in terms of data rate and link reliability.

Massive MIMO also known as large-scale antenna systems, very large MIMO, hyper-MIMO and full-dimension (FD) MIMO makes a break with previous MIMO practice through the use of a very large number of service antennas (e.g. hundreds or even thousands) that are operated fully coherently and adaptively. The very large number of antennas helps by focusing the transmission and reception of signal energy into ever-smaller regions of space. This brings huge improvements in throughput and energy efficiency, in particular when combined with simultaneous scheduling of a large number of user terminals (e.g., tens or hundreds). Massive MIMO was originally envisioned for time division duplex (TDD) operation, but can be applied also in frequency division duplex (FDD) operation. Other benefits of massive MIMO include the extensive use of inexpensive low-power components, reduced latency, simplification of the media access control (MAC) layer, and robustness to interference and intentional jamming.

One of the major changes from a 4G or LTE network to a 5G massive MIMO mobile network (wireless) communication system is the number of antennas in each gNodeB (gNB). The number of antennas for 5G massive MIMO is typically more than 100 antennas per gNB and could be as many as thousands. As there are usually at least 100 or more antennas within a gNB, the beam width of each antenna can be made much narrower.

MIMO therefore provides a method for multiplying the capacity of a radio link using multiple transmit antennas and multiple receive antennas to exploit multipath propagation. As such, massive MIMO plays an important role in 5G networks because such networks are designed to take advantage of multipath propagation between hundreds and possibly even thousands of transmit antennas and similar numbers of receive antennas. Massive MIMO is therefore an important physical layer technology for 5G NR networks due to its capability of high spectrum and energy efficiency, high spatial resolution, and simple transceiver design. However, to take advantage of its potential gains, the acquisition of CSI is crucial, but this faces a number of challenges such as the overhead of downlink training and feedback, and the computational complexity.

CSI consists of Channel Quality Indicator (CQI), PMI, CSI-RS resource indicator (CRI), strongest layer indication (SLI), RI and/or and L1-RSRP. CSI related values are computed in real time and used to try to optimize resource scheduling and spatial multiplexing among the various UEs that are requesting service. More efficient use of resources means that a system can serve more users at once. The optimization of spatial multiplexing can largely improve the system transmission efficiency. Therefore, it is highly desirable that the values reflect as accurately as possible the quality of the wireless (RF) channel, i.e., the accuracy of the transfer of bits in each direction over the wireless (RF) channel. Constraints on the processor power available to compute these values and constraints over the length of time the values remain accurate (i.e., limits to the delay in getting a value) make it difficult to optimize resource scheduling and spatial multiplexing. The computation becomes more complex if the UE is moving, since the RF conditions will vary as the user moves.

US2017264349 discloses a method performed in a UE for establishing a CSI feedback metric. The UE is configured with a grouping of available PMIs of a codebook. The grouping comprises two or more groups each of which comprises an exclusive subset of the available PMIs. The method comprises identifying, for one or more RIs, a respective parent PMI providing the highest link quality metric, LQM, and then establishing for one or more of the identified parent PMIs a respective set of child PMIs. The method involves determining a LQM for each child PMI of the established one or more sets of child PMIs and establishing the feedback metric to be the child PMI having the highest LQM. Whilst this method involves some reduction in computational complexity, it requires a two-step PMI assessment process which still engenders more than a desired level of complexity.

US2013315284 discloses a UE which can receive N or less different data streams transmitted in parallel over N antennas. The number of different data streams actually transmitted in parallel to the UE corresponds to the transmission rank, RI. If the speed of the UE does not exceed a predetermined threshold, the UE utilizes a full-size codebook containing precoder elements for all N RIs to determine a recommended RI and PMI for use in transmitting data to the UE. Otherwise, the UE utilizes a reduced-size codebook which excludes the precoder elements for at least RI-N to determine the recommended RI and PMI where RI-N corresponds to N different data streams being transmitted in parallel over the N antennas. The UE transmits an indication of the recommended RI and PMI to a node in the network. This method switches between a full codebook and a reduced codebook based on the speed of the UE relative to a threshold speed.

CN103401594 discloses a multi-user (MU) MIMO pairing method, which comprises establishing a spatial characteristic vector table on a BS side, and pairwise calculating the correlation coefficients of space vectors in the spatial vector table to obtain a correlation coefficient matrix. The method includes obtaining the optimal matching space vector of the uplink channel estimation and extracting the spatial characteristic vector of a user channel matrix, looking up the spatial correlation coefficient matrix by a dispatcher, looking up a user of which the spatial characteristic is orthogonal for pairing, applying a pairing result to downlink MU-MIMO emission, looking up an inter-user spatial correlation coefficient matrix by the dispatcher, looking up a user of which the spatial characteristic is orthogonal for pairing, and applying a pairing result to uplink MU-MIMO emission. The calculation complexity of the inter-user spatial correlation coefficient may be reduced by use of a table look-up mode.

US2012320783 discloses a method for determining CSI for use in a wireless communications network where the RI, PMI or CQI are determined based on channel covariance estimation and the Taylor series approximation of its inverse. Furthermore, the RI and PMI are determined separately. Separately determining PMI and RI can degrade network performance.

CN101626266 discloses a method for estimating RI and PMI. The method comprises: A. calculating a self-correlation matrix A of a channel matrix H: $A=H^H H$; B. carrying out singular value decomposition (SVD) on the matrix A: $A=V\Sigma V^H$, where V is a unitary matrix, and $\Sigma$ is a diagonal matrix; C. confirming a rank of the matrix H according to a matrix sigma and generating RI according to the rank of the matrix H; D. confirming a precoding matrix according to the rank of the matrix H and a matrix $V^H$ and generating PMI according to the precoding matrix. However, SVD involves a significant computational load and the RI is not accurate when a small singular value is obtained.

There is therefore a need for a much less computationally complex method of deriving a CSI such as PMI and/or RI in a time efficient manner.

OBJECTS OF THE INVENTION

An object of the invention is to mitigate or obviate to some degree one or more problems associated with known massive MIMO wireless (mobile) communication systems.

The above object is met by the combination of features of the main claims; the sub-claims disclose further advantageous embodiments of the invention.

Another object of the invention is to mitigate or obviate to some degree one or more problems associated with known mobile communication systems.

Another object of the invention is to provide a reduction in the computational complexity for deriving a PMI and/or a RI in a massive MIMO and/or a 5G NR wireless communication system.

One skilled in the art will derive from the following description other objects of the invention. Therefore, the foregoing statements of object are not exhaustive and serve merely to illustrate some of the many objects of the present invention.

SUMMARY OF THE INVENTION

In a first aspect, the invention provides a method of determining CSI in a MIMO wireless communication system, especially a massive MIMO system. The invention is intended particularly, but not exclusively, for use in a 5G NR wireless communication system. The 5G NR communication system employs end to end massive MIMO to efficiently utilize large numbers of antennas to increase network coverage and capacity. The CSI may comprise a PMI and/or a RI. The method comprises, for a matrix of channels comprising a link between a gNB and a UE, determining correlation values between all Discrete Fourier Transform (DFT) vectors and the observations from the channel matrix. The DFT vectors may include the horizontal vector direction and the vertical vector direction. The method includes selecting those DFT vectors in a selected vector direction having a correlation value greater than a predefined threshold to thereby identify a subset of all DFT vectors and determining said CSI from the selected subset of DFT vectors.

In a second aspect, the invention provides a UE for a MIMO wireless communication system, said UE comprising: a memory; and a processor connected to the memory configured to perform the steps of the method according to the first aspect of the invention.

In a third aspect, the invention provides a BS for a MIMO wireless communication system, said gNB comprising: a memory; and a processor connected to the memory configured to: send a set of CSI reference signals (RSs) to a UE; and receive from said UE a CSI determined from a subset of all DFT vectors from a matrix of channels for said set of CSI-RSs comprising a link between the gNB and the UE.

In a fourth aspect, the invention provides a non-transitory computer readable medium storing machine executable instructions, which, when such instructions are executed by a processor, configure the processor to implement the steps of the methods of the first aspect of the invention.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which:

FIG. 1A is a block diagram illustrating a method of determining Channel State Information (CSI) in a multiple input/multiple output (MIMO) wireless communication system.

FIG. 2 is a diagram illustrating, by way of example only, an access network for embodiments of the present application;

FIG. 3 illustrates a gNB for embodiments of the invention;

FIG. 4 illustrates a UE for embodiments of the invention;

FIG. 13 illustrates the degree or amount of reduction of computational complexity for type I single panel codebooks provided by the methods of the invention.

DESCRIPTION OF PREFERRED EMBODIMENTS

Figure 1:
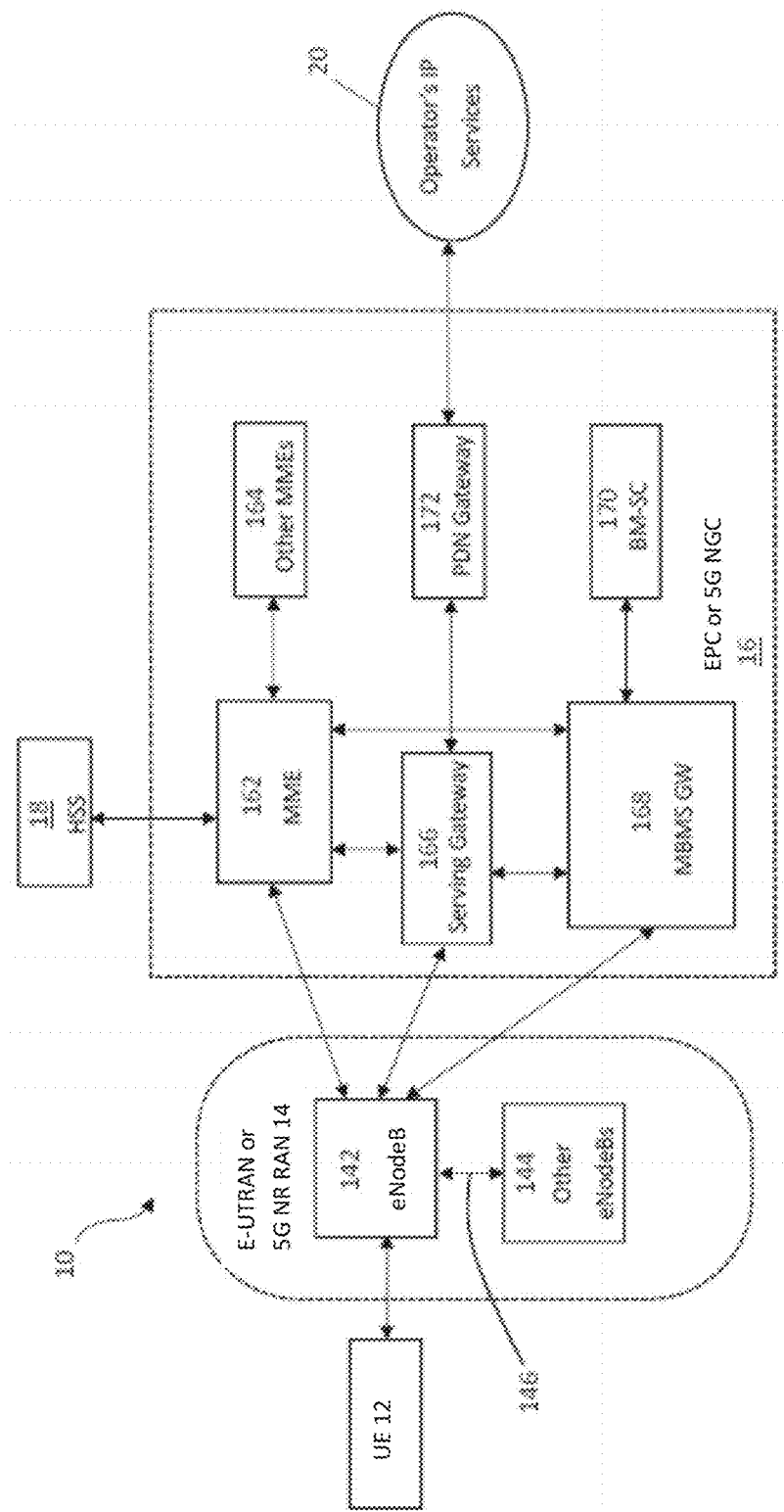
FIG. 1 is a diagram illustrating, by way of example only, a network architecture for embodiments of the present application.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

FIG. 1 is a diagram illustrating, merely by way of example only, an LTE network architecture 10 in which the methods of the present application can be performed, but it will be understood by one skilled in the art that the methods may be performed in other network architectures, especially an LTE network modified to operate the 5G NR standard or interoperate with a 5G NR network. It will further be understood that, as 5G NR networks fully develop and are implemented, the methods of the invention described herein can be performed wholly within such networks.

The LTE network architecture 10 of FIG. 1 may be referred to as an Evolved Packet System (EPS) 10. The EPS 10 may include one or more user equipment (UE) 12, an Evolved UMTS Terrestrial Radio Access Network (E-UTRAN) 14, an Evolved Packet Core (EPC) 16, a Home Subscriber Server (HSS) 18, and an Operator's Internet Protocol (IP) Services 20. The EPC 16 can interconnect with other access networks, but for simplicity those entities/interfaces are not shown.

The EPC 16 may be replaced by a 5G Next Generation Core (NGC) network which may have a different physical configuration to that of the EPC 16 shown in FIG. 1, but the methods of the invention will be able to be implemented by the 5G NGC network. Therefore, in the following description reference will be made to the EPC 16 by way of illustrating the steps of the methods of the invention.

The E-UTRAN 14 comprises the radio access network (RAN) and this may be replaced by a 5G NR RAN, but the methods of the invention will be able to be implemented by the 5G NR RAN. Therefore, in the following description reference will be made to the E-UTRAN 14 by way of illustrating the steps of the methods of the invention.

The E-UTRAN 14 includes an eNB 142 and other eNBs 144. The eNB 142 provides user and control plane protocol terminations toward the UE 12. The eNB 142 may be connected to the other eNBs 144 via a backhaul (e.g., an X2 interface) 146. The eNB 142 may also be referred to herein as a BS, a gNB, a Node B, an access point, a transmission receiving point (TRP), a base transceiver station, a radio base station, a radio transceiver, a transceiver function, a basic service set (BSS), an extended service set (ESS), or some other suitable terminology. The eNB 142 provides an access point to the EPC 16 for a UE 12. Examples of a UE 12 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device including any IoT compatible devices or the like. The UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 142 is connected to the EPC 16. The EPC 16 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 is the control node that processes the signaling between the UE 12 and the EPC 16. Generally, the MME 162 provides bearer and connection management. All user IP packets are transferred through the Serving Gateway 166, which itself is connected to the PDN Gateway 172. The PDN Gateway 172 provides UE IP address allocation as well as other functions. The PDN Gateway 172 is connected to the Operator's IP Services 20. The Operator's IP Services 20 may include the Internet, an intranet, an IP Multimedia Subsystem (IMS), and a PS Streaming Service (PSS). The BM-SC 170 may provide functions for MBMS user service provisioning and delivery. The BM-SC 170 may serve as an entry point for content provider MBMS transmission, may be used to authorize and initiate MBMS Bearer Services within a PLMN, and may be used to schedule and deliver MBMS transmissions. The MBMS Gateway 168 may be used to distribute MBMS traffic to the eNBs (e.g., 142, 144) belonging to a Multicast Broadcast Single Frequency Network (MBSFN) area broadcasting a particular service, and may be responsible for session management (start/stop) and for collecting eMBMS related charging information.

FIG. 1A is a block diagram illustrating a method of determining Channel State Information (CSI) in a multiple input/multiple output (MIMO) wireless communication system. The method has the steps of:

A. For a matrix of channels comprising a link between a gNodeB (gNB) and a user equipment (UE), determining correlation values for all Discrete Fourier Transform (DFT) vectors in one or more selected vector directions based on observations of the channel matrix;

B. selecting the DFT vectors in at least one of said selected vector directions having a correlation value greater than a predefined threshold to thereby identify a subset of all DFT vectors; and C. determining said CSI from the selected subset of DFT vectors.

FIG. 2 is a diagram illustrating an example of an access network 200 in an LTE network architecture such as that described with respect to FIG. 1. Again, it will be understood that an access network for a 5G NR network may have a different physical configuration to the access network 200 of FIG. 2, but reference here to the access network 200 should be taken as a reference to a 5G NR access network. In this example, the access network 200 is divided into a number of cellular regions (cells) 202. There is no centralized controller in this example of an access network 200, but a centralized controller may be used in some configurations. The eNBs 204 may be configured to provide all radio related functions including radio bearer control, admission control, mobility control, scheduling, security, and connectivity to the serving gateway 166. An eNB may support one or multiple cells (also referred to as a sector). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is preferably used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system, but extend also to the 3GPP Technical Specification Group Radio Access Network, NR, Physical layer procedures for data (Release 15).

FIG. 3 illustrates a basic structure of a gNB 300 for implementing the methods of the invention. The gNB 300 comprises a massive number of 100 or more antenna elements 302 (only a small number of antenna elements are shown for clarity of the drawing), a communications module 304 for communicating wirelessly with a UE and communicating with other components of a wireless communication system. The gNB 300 is also provided with a non-transitory memory 306 storing machine readable instructions for execution by a processor 308. When executing the machine instructions, the processor 308 configures the gNB 300 to implement the methods of the invention.

FIG. 4 illustrates a basic structure of a UE 400 for implementing the methods of the invention. The UE 400 comprises at least one antenna 402, but may include multiple antennas 302 or even a massive number of 100 or more antenna elements 402. It is also provided with a communications module 404 for communicating wirelessly with one or more BSs 300. The UE 400 also has a non-transitory memory 406 storing machine readable instructions for execution by a processor 408. When executing the machine instructions, the processor 408 configures the UE 400 to implement the methods of the invention.

Figure 5:
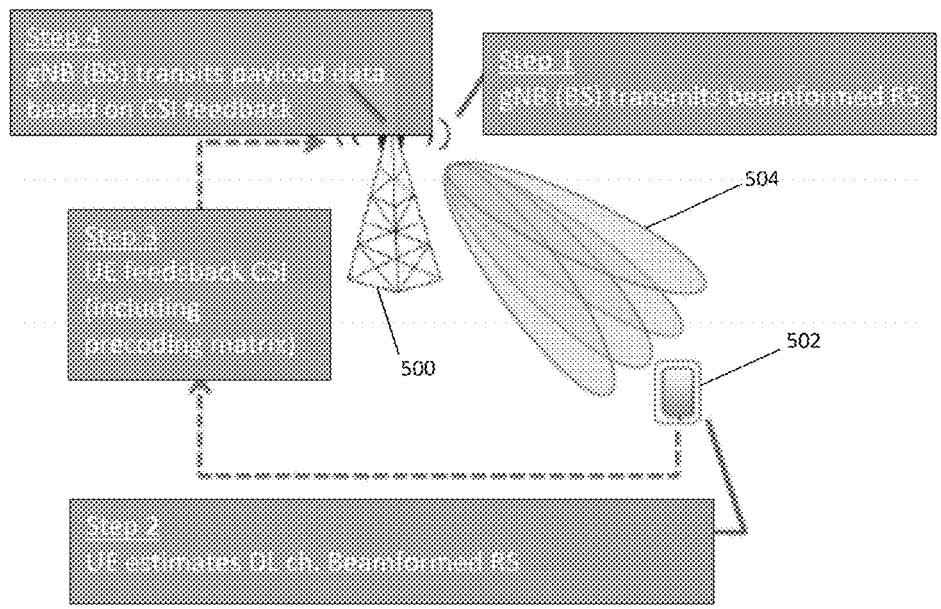
FIG. 5 illustrates an existing CSI-RS and CSI acquisition method in a MIMO communications system by way of background.

By way of background to the methods of the invention described below, FIG. 5 illustrates an existing CSI-RS and downlink (DL) CSI acquisition method in a MIMO wireless communication system including the transmitting of payload data from a gNB 500 to the UE 502 based on the CSI feedback.

The method illustrated by FIG. 5 comprises a first step of the gNB 500 transmitting CSI-RS(s) to the UE 502. In a second step, the UE 502 performs a DL channel estimation based on the CSI-RS(s) and, in a third step, the UE 502 feeds back CSI to the gNB 500. The CSI fed back by the UE 502 includes a PMI in a manner consistent with the existing 3GPP standards. A fourth step comprises the gNB 500 utilizing the reported CSI to transmit payload data on the DL to the UE 502.

Massive MIMO when compared to classical MIMO can be considered as an operating condition of a wireless communication system where multiuser interference and noise are small compared to pilot contamination. This depends in general on several factors: the number of gNB antennas, the number of UEs per degree of freedom offered by the channel where the degree of freedom comprises the rank of the antenna correlation matrix which might be smaller than the number of gNB antennas, the signal-to-noise ratio (SNR) and the path loss. Generally speaking, however, massive MIMO is considered as applicable in wireless communication systems operating according to the 3GPP standards where at least the gNB has 100 or more antennas and possibly involving hundreds or even thousands of antennas installed at the gNB. It is also envisaged that UEs will have multiple antennas and may have massive numbers of antennas or antenna elements in excess of 100 or more. Massive MIMO promises significant gains in wireless network capacity, spectrum efficiency as well as offering the possibility of greatly reducing energy consumption, enhancing the reliability and reducing latency.

Whilst massive MIMO is viewed as an enabler of the next generation of wireless communications, i.e. 5G, it is still applicable to the LTE standard. In fact, the 3GPP has defined the notion of "Transmission Modes" (TMs) for different usage of MIMO in LTE, which can be categorized as transmit diversity, spatial multiplexing and beam-forming. TM 7 is defined in 3GPP Release 8, where an arbitrary number of physical antennas at the gNB can be used as a logical antenna port (port 5) to create a narrow beam towards a targeted UE. Release 9 extends TM 7 to TM 8, giving the possibility of transmitting a dual stream to a single or two UEs, whereas in release 10, this is further extended to TM 9 where up to 8 layers for a single user transmission and up to 4 layers for multi-user transmission is supported. Release 11 adds TM 10, similar to TM 9 with up to 8 layers transmission but the transmit antennas can be physically located on different BSs. In Release 13, no new transmission mode is defined, but CSI RS has been extended to 16 ports. Moreover, Release 14 on the enhancement of Full-Dimension MIMO (considered as a special case of Massive MIMO in 3GPP) for LTE has extended the CSI RS to 32 ports with enhancement on CSI reports and support for providing higher robustness against CSI impairments. The methods of the invention are applicable to 5G NR communication systems as well as applicable to existing LTE communication systems as illustrated by way of example by FIGS. 1 and 2.

Figure 6:
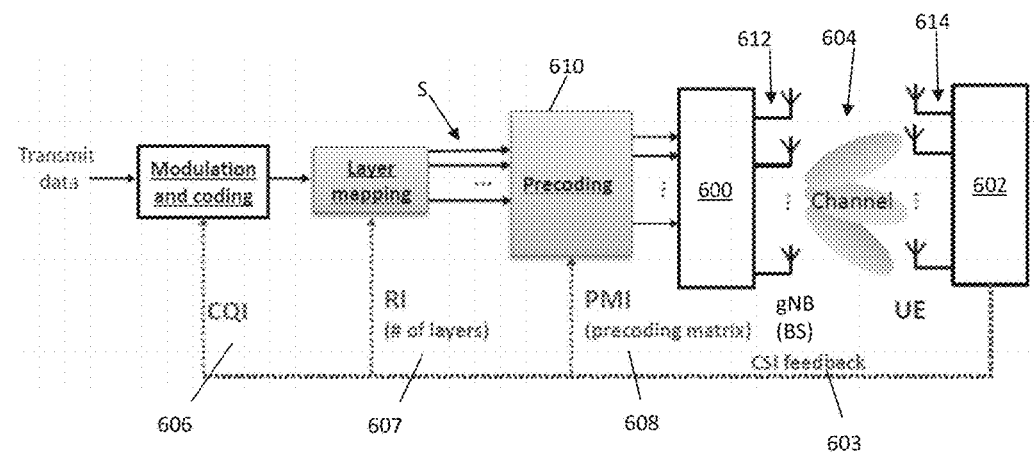
FIG. 6 illustrates a CSI acquisition method in a MIMO communications system implementing data transmission in accordance with the LTE standard.

FIG. 6 illustrates a CSI acquisition method in a MIMO communications system implementing data transmission in accordance with the LTE standard, although the CSI acquisition method is applicable to other types of network. MIMO transmission of data can be transmitted through the rank of channel. The rank of channel is the number of linearly independent channels which can transmit data simultaneously. The number of layers for data transmission is equal to or less than the rank of channel.

In FIG. 6, a UE 602 provides feedback on a radio-link channel 604 between the UE 602 and a node such as a gNB 600 of the wireless communication system. Such feedback is, as is apparent from the foregoing, called CSI 603 and, based on channel estimation performed by the UE 602, the UE 602 derives the CQI 606, RI 607 and PMI 608 as reference parameters of CSI for DL transmission, although the UE 602 may not derive all three indicators simultaneously in all instances. The CQI 606 comprises the channel modulation and coding rate and shows the status of the channel quality. Good channel quality allows more bits per channel to be transmitted and the use of less redundancy in coding. The RI 607 refers to the number of transmission layers in the channel. The PMI 608 is a preferred precoding matrix selected from a predefined codebook 610 known to both the gNB 600 and the UE 602. During operation, the UE 602 feedbacks the CSI 603 to the gNB 600 and the gNB 600 applies the CSI 603 in DL data transmission from the gNB 600 and the UE 602.

It can be seen that the wireless communication system illustrated by FIG. 6 comprises a MIMO communication system in which the gNB 600 has multiple ($N_T$) antennas 612 and the UE has multiple ($N_R$) antennas 614. The multiple gNB antennas 612 and the multiple UE antennas 614 enable multipath propagation of signals between the gNB 600 and the UE 602 such that the channel 604 can be considered as comprising a channel matrix in a manner consistent with the principles of MIMO signal transmission.

Data received in the UE antennas 614 can be expressed by the equality:

$$Y=HWs+n$$

where:

Y is the received data;

H is the channel matrix;

W is the selected precoding matrix identified by the PMI 608;

s is the number data streams to be transmitted; and n is the Gaussian white noise.

There are several requirements for CSI 603. The reported RI 607 represents the optimum number of layers for MIMO transmission. Moreover, the reported PMI 608 should optimize a performance metric for a given RI 607. However, the conventional method for deriving RI 607 and/or PMI 608 is to determine a performance metric having the best RI and PMI combination by way of an exhaustive search. Such an exhaustive search necessitates a very high degree of computational complexity given the number of variables which must be considered. For example, for a type I single panel codebook for 1 layer, the number of codebooks is 1024 for RI=1, 2048 for RI=1, 5, 6, 7, 8, and 1024 for RI=3, 4. Consequently, to find an optimal combination of PMI and RI using a conventional search methodology has a complexity value of (1024*5)+2048+(2*1024)=9216 leading to a high computational workload, particularly for UEs having limited computational capacity.

The present application describes a method capable of significantly reducing the computational complexity for deriving RI and/or PMI by enabling a reduction in the search space in the precoding matrix codebooks for each RI. The method hereinafter described is applicable to at least mobile communication systems configured in accordance the LTE standard and/or the 5G NR standard.

Figure 7:
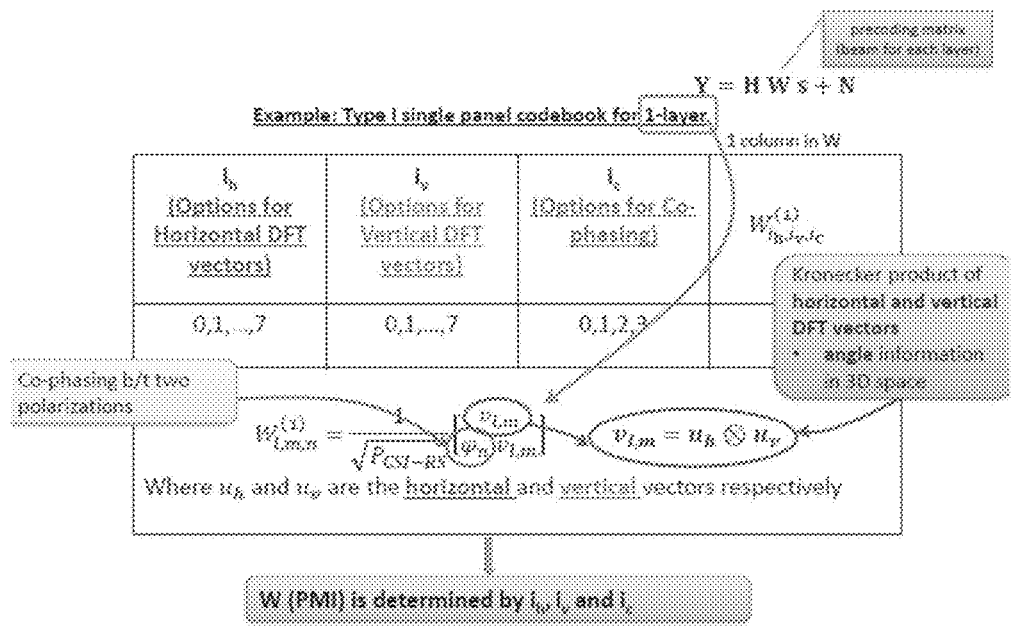
FIG. 7 illustrates how a precoding matrix is determined in a type I single panel codebook for 1-layer in 3GPP TS38.214 Release 15 standard.

FIG. 7 illustrates a codebook structure in accordance with the 3GPP TS38.214 Release 15 standard. Using a type I single panel codebook for 1 layer by way of example only, the precoding matrix can be expressed by the following function:

$$W_{l,m,n}^{(1)} = \frac{1}{\sqrt{P_{CSI-RS}}} \begin{bmatrix} v_{l,m} \\ \varphi_n v_{l,m} \end{bmatrix}$$

where:

$v_{l,m}$ represents the Kronecker product of the horizontal and vertical DFT vectors comprising the channel matrix;

$\varphi_n$ represents the co-phasing between two polarizations; and $P_{CSI-RS}$ represents the number of CSI-RS ports.

It can be derived from FIG. 7 that the precoding matrix may be determined by the options for horizontal DFT vectors, options for vertical DFT vectors and options for co-phasing.

Figure 8:
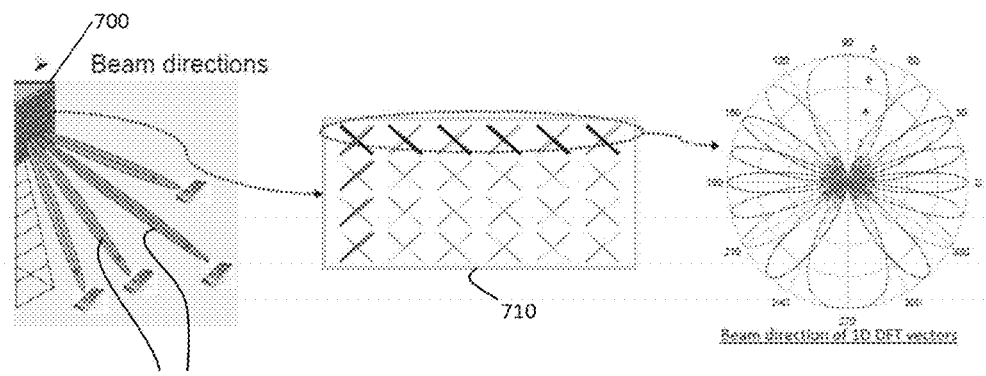
FIG. 8 illustrates that the antenna array in one polarization can form directional beams by doing precoding based on the DFT vectors.

FIG. 8 illustrates that, by doing precoding based on the DFT vectors, the antenna array in one polarization can form directional beams especially in massive MIMO with the large number of transmit antennas in the antenna array. Consequently, it is possible to limit consideration to only the beams which are generally orientated in a desired direction towards, for example, a UE as reflected by their correlation values hereinafter explained.

Figure 9:
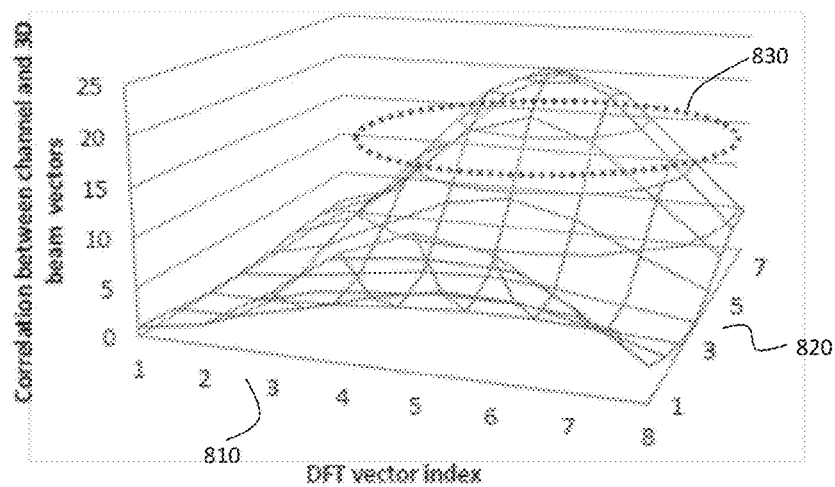
FIG. 9 illustrates the correlation between the channel matrix and the three-dimensional (3D) beam vectors.

FIG. 9 illustrates the correlation between the channel matrix and the three-dimensional (3D) beams 720. It can be seen in FIG. 9 that the horizontal DFT vectors 810 and vertical DFT vectors 820 comprising the channel matrix 710 have correlation values which combined vary in both horizontal and vertical space. It is possible therefore to limit consideration to only those DFT vectors 810, 820 which are generally orientated in a desired horizontal and/or vertical direction, i.e. those DFT vectors 810, 820 encompassed by dashed line 830 in FIG. 9 which have correlation values above respective predefined threshold(s).

The present application therefore proposes an algorithm for reducing the codebook search space for the optimal beams that match a selected channel property (performance metric or parameter) in an efficient way. It is envisaged that the method for reducing the codebook search space will be performed by the processors of the UEs when executing machine readable instructions stored in their non-transitory computer memories, although the method or similar methods may also be implemented by other nodes in the MIMO wireless communication system such as the BSs.

Figure 10:
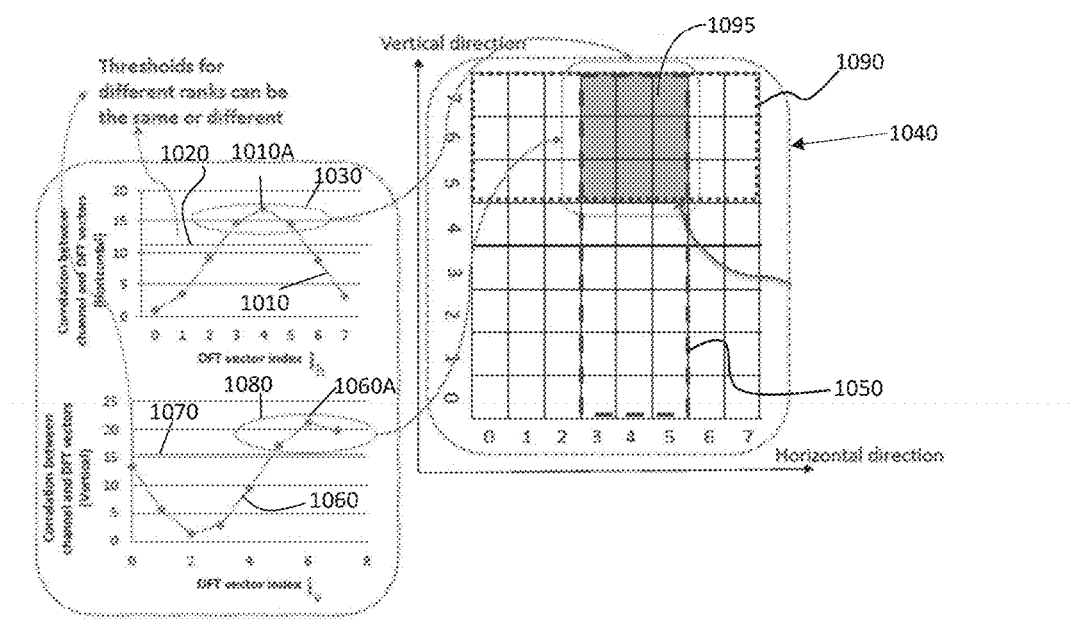
FIG. 10 illustrates the codebook search space restriction method in accordance with the invention.

FIG. 10 illustrates at the codebook search space restriction method in accordance with the present application. The first step of the method is to calculate the correlation between channel observations and all the horizontal and/or vertical DFT vectors of the channel matrix 710. Preferably, both the horizontal and vertical DFT vectors are used.

Figure 11:
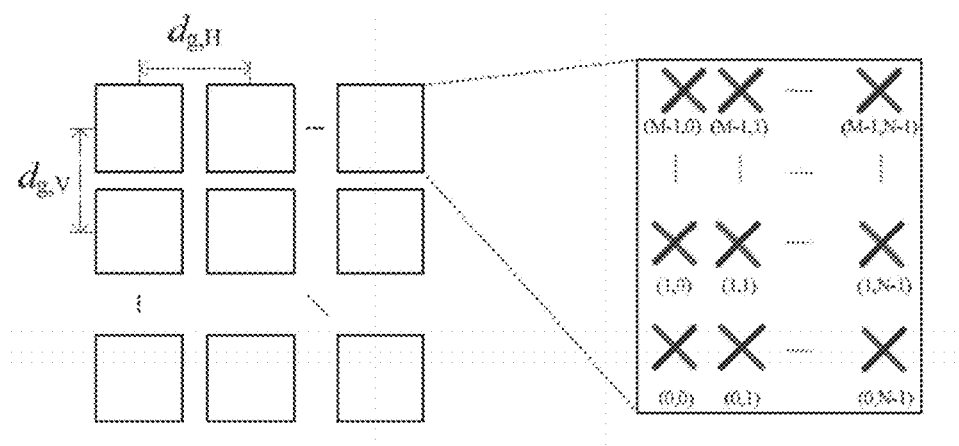
FIG. 11 illustrates the gNB antenna model comprising a uniform rectangular panel array.

The observations of the channel matrix 710 for determining correlation values may be obtained by permutation of the channel matrix 710 as more fully described below with respect to FIGS. 11 and 12. The channel observations are performed by the UE 502, 602 on receiving suitable CSI-RSs from the gNB 500, 600. The correlation values may be calculated from the Frobenius norm of the product of the observations of the channel matrix and all the DFT vectors comprising the channel matrix 710. The correlation values may be determined for one polarization or multiple polarizations.

When calculating the correlation between the DFT vectors and the channel observations, the antenna numbering and the codebook structure should be considered. As illustrated in FIG. 11, the gNB antenna model is a uniform rectangular panel array, comprising $M_g N_g$ panels, where $M_g$ is number of panels in a column and $N_g$ is number of panels in a row. The antenna panels are uniformly spaced in the horizontal direction with a spacing of $d_{g,H}$ and in the vertical direction with a spacing of $d_{g,V}$. On each antenna panel, antenna elements are placed in the vertical and horizontal directions, where N is the number of columns and M is the number of antenna elements with the same polarization in each column. Antenna numbering on the panel illustrated in FIG. 11 assumes observation of the antenna array from the front (with the x-axis pointing towards the broad-side and increasing y-coordinate for increasing column number). The antenna elements are uniformly spaced in the horizontal direction with a spacing of $d_H$ and in the vertical direction with a spacing of $d_V$. The antenna panel is either single polarized (P=1) or dual polarized (P=2). The rectangular panel array antenna can be described by the following tuple $(M_g, N_g, M, N, P)$.

Figure 12:
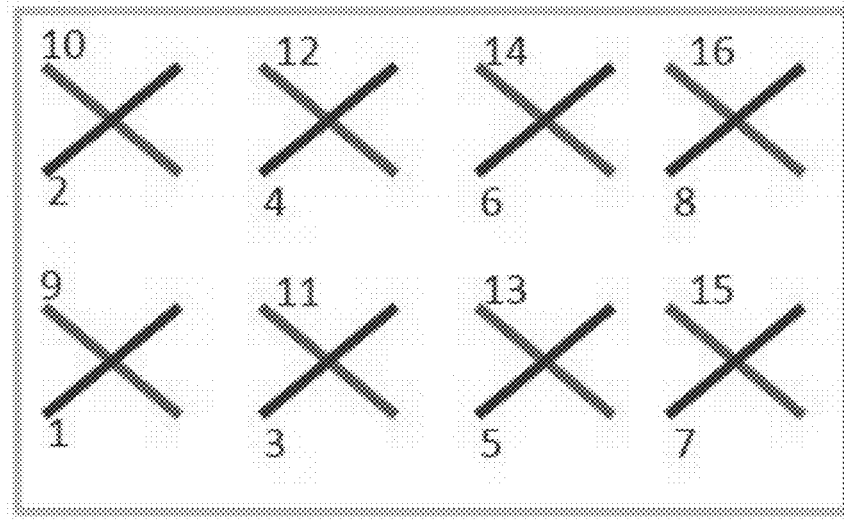
FIG. 12 illustrates an example of the antenna numbering with $N_1=4$, $N_2=2$, and P=2.

FIG. 12 shows an example of the antenna numbering with $N_1=4$, $N_2=2$, and P=2. Traditionally, the numbering starts from one polarization in the vertical direction. After all the antenna elements in this polarization are numbered then the numbering for another polarization is started.

It is assumed that the antenna configuration for the gNB is $(1, 1, N_2, N_1, 2)$, the number of receive antennas is $N_{Rx}$, then the number of transmit antennas is $N_{Tx}=N_1 \times N_2 \times 2$. The channel matrix can therefore be expressed as:

$$H = \begin{bmatrix} h_{0,0} & \cdots & h_{0,N_{Tx}-1} \\ \vdots & \ddots & \vdots \\ h_{N_{Rx}-1,0} & \cdots & h_{N_{Rx}-1,N_{Tx}-1} \end{bmatrix}$$

The channel matrix is divided into two blocks for the two polarizations:

$$H = [H_1 H_2]$$

where:

$$H_1 = \begin{bmatrix} h_{0,0} & \cdots & h_{0,N_{Tx}/2-1} \\ \vdots & \ddots & \vdots \\ h_{N_{Rx}-1,0} & \cdots & h_{N_{Rx}-1,N_{Tx}/2-1} \end{bmatrix}$$

$$H_2 = \begin{bmatrix} h_{0,N_{Tx}/2} & \cdots & h_{0,N_{Tx}-1} \\ \vdots & \ddots & \vdots \\ h_{N_{Rx}-1,N_{Tx}/2} & \cdots & h_{N_{Rx}-1,N_{Tx}-1} \end{bmatrix}$$

Assuming an oversamping rate for horizontal and vertical is $O_1$ and $O_2$ respectively, the DFT vectors for vertical and horizontal directions are:

$$\text{Vertical } DFT \text{ vectors}: u_m = \begin{bmatrix} 1 & e^{j\frac{2\pi m}{O_2 N_2}} & \cdots & e^{j\frac{2\pi m(N_2-1)}{O_2 N_2}} \end{bmatrix}$$

-continued

Horizontal DFT vectors: $p_l = \begin{bmatrix} 1 & e^{j\frac{2\pi l}{O_2 N_1}} & \cdots & e^{j\frac{2\pi l(N_1-1)}{O_1 N_1}} \end{bmatrix}$ $u_m$ and $p_l$ are transformed to $\hat{u}_m$ and $\hat{p}_l$ such that:

$\hat{u}_m = [u_m u_m \cdots u_m]^T$ $\hat{u}_m$ is composed by $N_1$ repetitions of $u_m$. The size of $\hat{u}_m$ is $[(N_1 \times N_2), 1]$.

$\hat{p}_l = [\tilde{p}_{l1} \tilde{p}_{l2} \cdots \tilde{p}_{lk} \cdots \tilde{p}_{lN_2}]^T$ $\tilde{p}_{lk} = [p_l(k) \cdots p_l(k)]$ where $p_l(k)$ is the kth element of the matrix $p_l \cdot \tilde{p}_{lk}$ is composed by $N_2$ repetitions of $p_l(k)$. The size of $\hat{p}_l$ is $[(N_1 \times N_2), 1]$.

Thus, the correlation between channel observations and the horizontal DFT vectors is:

$$\text{Corr}_l^1 = \|H_1 \hat{p}_l\|_F^2 + \|H_2 \hat{p}_l\|_F^2 = \sum_{j=0}^{N_{Rx}-1} \left( \sum_{i=0}^{N_{Tx}/2-1} (h(j,i)\hat{p}_l(i))^2 + \sum_{i=N_{Tx}/2}^{N_{Tx}-1} (h(j,i)\hat{p}_l(i))^2 \right)$$

where $\|A\|_F$ is the Frobenius norm of matrix A. $h(j,i)$ is the channel coefficient between the jth received antenna and the ith transmit antenna. $\hat{p}_l(i)$ is the ith element in the matrix $\hat{p}_l$.

The correlation between channel observations and the vertical DFT vectors is:

$$\text{Corr}_m^2 = \|H_1 \hat{u}_m\|_F^2 + \|H_2 \hat{u}_m\|_F^2 = \sum_{j=0}^{N_{Rx}-1} \left( \sum_{i=0}^{N_{Tx}/2-1} (h(i,j)\hat{u}_m(i))^2 + \sum_{i=N_{Tx}/2}^{N_{Tx}-1} (h(j,i)\hat{u}_m(i))^2 \right)$$

It should be noted, however, that, where only, for example, the horizontal DFT vectors 810 are used to restrict the codebook search space, it is then only necessary to calculate or determine the correlation values between the channel observations and the horizontal DFT vectors 810.

As shown in FIG. 10, a curve 1010 maps the correlation values between the channel observations and the horizontal DFT vectors 810. The curve 1010 has a maximum value 1010A. A predefined threshold denoted by line 1020 may be calculated or selected to identify those horizontal DFT vectors 810 having a correlation value greater than the predefined threshold 1020. In this instance, the horizontal DFT vectors having a correlation value greater than the predefined threshold 1020 are encompassed by the ringed line 1030. Thus, if only horizontal DFT vectors 810 are used to restrict the search space of the codebook, this will lead to a vertically extending restricted search area denoted by dotted line 1050 in the total search space area 1040 for all DFT vectors/beams.

Also as shown in FIG. 10, a curve 1060 can be derived for the correlation values of the vertical DFT vectors 820. The curve 1060 maps the correlation values between the channel observations and the vertical DFT vectors 820. The curve has a maximum value 1060A. A predefined threshold denoted by line 1070 may be calculated or selected to identify those vertical DFT vectors 820 having a correlation value greater than the predefined threshold 1070. In this instance, the vertical DFT vectors 820 having a correlation value greater than the predefined threshold 1070 are encompassed by the ringed line 1080. Thus, if only the vertical DFT vectors 820 are used to restrict the search space 1040 of the codebook, this will lead to a horizontally extending restricted search area denoted by dotted line 1090 in the total search space area 1040 for all DFT vectors/beams.

In preferred embodiments, both the horizontal DFT vectors 810 and the vertical DFT vectors 820 are utilized leading to a restricted search area 1095 denoted by the shaded area in FIG. 10, where said shaded area comprises the overlap of the vertically extending restricted search area 1050 and the horizontally extending restricted search area 1090.

The first step described above may be repeated for each RI.

The predefined threshold may comprise a product of a respective maximum correlation value and a predefined fractional number less than one. The predefined threshold calculated for the horizontal DFT vectors 810 will in most instances be different to the threshold value calculated for the vertical DFT vectors 820, but, in some embodiments, the same threshold value may be selected for both horizontal and vertical DFT vectors 810, 820.

By way of example only, using 0.7 as the factor or predefined fractional number for purposes of illustration in FIG. 10, the horizontal DFT vector indices ($i_h$) from 3 to 5 will be selected by defining the threshold as 0.7 multiplied by the maximum correlation value 1010A between the channel observations and the horizontal DFT vectors 810. Similarly, the vertical DFT vector index ($i_v$) from 5 to 7 will be selected by defining the threshold as 0.7 times the maximum correlation value 1060A between the channel observations and the vertical DFT vectors 820. When using both the horizontal DFT vectors 810 and the vertical DFT vectors 820, the search space in this instance is now reduced to three vertical directions by three horizontal directions (($i_h$) from 3 to 5 by ($i_v$) from 5 to 7) which amounts to a substantial reduction in the codebook search space over conventional methods. Consequently, the method according to the present application can significantly reduce the search space in codebooks for each RI. The predefined thresholds can also be the same or different for different ranks of channel or RIs.

By enabling the codebook search space to be significantly restricted for each RI, the present application provides a method of determining a CSI-I in a MIMO wireless communication system comprising the steps of: for a matrix of channels comprising a link between a gNB and UE, determining correlation values for all DFT vectors comprising said channel matrix in a selected vector direction based on observations of the channel matrix; selecting the DFT vectors in said selected vector direction having a correlation value greater than a predefined threshold to thereby identify a subset of all DFT vectors; and determining said CSI-I from the selected subset of DFT vectors where said CSI-I may comprise a RI and/or a PMI. Preferably, the method includes using the restricted search space to obtain a PMI which improves or preferably optimizes a selected performance metric. The performance metric may comprise any of: channel capacity; signal to noise (SNR) ratio; received power; signal to interference ratio (SIR), signal to interference and noise ratio (SINR); or energy per bit to noise power spectral density ratio, but preferably comprises one of channel capacity or SNR.

The present application comprises two main methods to achieve the same general objective, namely of reducing the computational complexity of deriving PMI and/or RI.

A first method to reduce the computational complexity for deriving RI/PMI comprises a separated determination methodology. In this method, the first step is as above, namely to calculate the correlation between the channel matrix and all horizontal/vertical DFT vectors. A second step is to select the horizontal/vertical DFT vectors based on the predefined threshold(s) for each RI, and then restrict the PMI search space based on the selected horizontal/vertical DFT vectors. A third step is to separately determine the DFT vectors to optimize a performance metric and determine a co-phasing factor based on the selected beam (DFT) vectors, and then obtain a final PMI. A last step is to determine the RI and the corresponding PMI to improve or preferably optimize the performance metric.

More specifically, the first method involves using the restricted search space to select a number of beam vectors where the number of selected beam vectors is the number of beams used in each PMI and to separately determine a co-phasing factor based on the selected beam vectors and the selected performance metric followed by obtaining a final PMI. Beam vector selection is based on a calculation of a correlation between all of the beam vectors in the restricted search space and observations of beams of the channel matrix wherein the beam vectors are selected which satisfy the PMI having a largest sum of correlation values. The beam vectors may be selected based on maximizing a summation of capacity for each layer with one polarization. The beam vectors may be selected based on optimizing the selected performance metric with a fixed co-phasing factor. The final step as before is preferably to determine a combination of a PMI and a RI to optimize the selected performance metric.

In contrast, a second method to reduce the computational complexity for deriving RI/PMI uses a joint determination methodology. In this method, the first and second steps are the same as in the first method. A third step is to jointly determine the DFT vectors and the co-phasing factor based on the restricted PMI search space. A last step is the same as the last step in the first method.

FIG. 13 illustrates the degree or amount of reduction of computational complexity for type I single panel codebooks provided by the methods according to the present application. More specifically, FIG. 13 illustrates a comparison in computational complexity between conventional exhaustive search method and the proposed methods according to the present application. For the conventional exhaustive search method, the computation complexity for type I single panel codebooks is based on 1024 for RIs 1 and 5-8, 2048 for RI 2, and 1024 for RIs 3-4. For the methods according to the present application, the computational complexity for type I single panel codebooks is 68 for RIs 1 and 5-8, 258 for RI 2, 258 for RI 3-4. It is necessary to calculate the correlation between the channel matrix and 16 DFT vectors for deriving the reduced search space. Consequently, it is found that the computational complexity for the methods of the present application is reduced by 87.73% on the assumption that the threshold reduced the 50% percentile of the search DFT vectors. The methods according to the present application can be applied to other types of codebooks and result in similar reductions of computational complexity.

The invention also provides a UE having a memory; and a processor connected to the memory configured to perform the steps of: for a matrix of channels comprising a link between a gNB and a UE, determine correlation values for all DFT vectors comprising said channel matrix in a selected vector direction based on observations of the channel matrix; select the DFT vectors in said selected vector direction having a correlation value greater than a predefined threshold to thereby identify a subset of all DFT vectors; and determine said CSI from the selected subset of DFT vectors.

The invention also provides a gNB having a memory; and a processor connected to the memory configured to: send a set of CSI-RSs to a UE; and receive from said UE a CSI determined from a subset of all DFT vectors from a matrix of channels for said set of CSI-RSs comprising a link between the gNB and the UE.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of determining Channel State Information (CSI) in a multiple input/multiple output (MIMO) wireless communication system, the method comprising the steps of:
    for a matrix of channels comprising a link between a gNodeB (gNB) and a user equipment (UE), determining correlation values for all Discrete Fourier Transform (DFT) vectors in one or more selected vector directions based on observations of the channel matrix;
    selecting the DFT vectors in at least one of said selected vector directions having a correlation value greater than a predefined threshold to thereby identify a subset of all DFT vectors; and
    determining said CSI from the selected subset of DFT vectors.

2. The method of claim 1, wherein the predefined threshold comprises a product of a maximum correlation value and a predefined fractional number less than one.

3. The method of claim 1, wherein the observations of the channel matrix for determining the correlation values are obtained by permutation of the channel matrix.

4. The method of claim 1, wherein the correlation values are calculated from the Frobenius norm of the product of the observations of the channel matrix and all the DFT vectors.

5. The method of claim 1, wherein, when the one or more selected vector directions comprise both a horizontal vector direction and a vertical vector direction, the method including using a first predefined threshold for the horizontal vector direction and a second predefined threshold for the vertical vector direction.

6. The method of claim 1, wherein said CSI comprises a Precoding Matrix Indicator (PMI) and/or a Rank Indicator (RI).

7. The method of claim 1, wherein the step of determining correlation values for all DFT vectors of said channel matrix in a selected vector direction is based on observations of the channel matrix in a same direction.

8. The method of claim 1, wherein the step of selecting the DFT vectors is repeated for each possible RI.

9. The method of claim 1, wherein the subset of all DFT vectors is used to restrict a size of a search space for obtaining a PMI in a codebook.

10. The method of claim 9, further comprising the step of using the restricted search space to obtain a PMI which improves or preferably optimizes a selected performance metric.

11. The method of claim 10, wherein the performance metric comprises any of: channel capacity; signal to noise ratio (SNR); received power; signal to interference ratio (SIR); signal to interference and noise ratio (SINR); or energy per bit to noise power spectral density ratio.

12. The method of claim 10, further comprising the step of using the restricted search space to jointly determine the DFT vectors and a co-phasing factor to obtain the PMI which improves or preferably optimizes the selected performance metric.

13. The method of claim 12, further comprising the step of determining a combination of a PMI and a RI to optimize the selected performance metric.

14. The method of claim 10, further comprising the steps of: using the restricted search space to select a number of beam vectors where the number of selected beam vectors is the number of beams used in each PMI; determining a co-phasing factor based on the selected beam vectors and the selected performance metric; and obtaining a final PMI.

15. The method of claim 14, wherein beam vector selection is based on a calculation of a correlation between all of the beam vectors in the restricted search space and observations of beams of the channel matrix wherein beam vectors are selected which satisfy the PMI having a largest sum of correlation values.

16. The method of claim 14, wherein beam vectors are selected based on any one of:
    maximizing a summation of capacity for each layer with one polarization; or
    optimizing the selected performance metric with a fixed co-phasing factor.

17. The method of claim 9, further comprising the steps of: determining the DFT vectors from the subset of all DFT vectors which improve or preferably optimize a performance metric; determining a co-phasing factor based on the DFT vectors selected to improve or preferably optimize the performance metric; and determining a final PMI.

18. The method of claim 1, wherein the MIMO communication system is any of a massive MIMO communication system, a large-scale antenna communication system, a very large MIMO communication system, a hyper MIMO communication system, or a full-dimension (FD) MIMO communication system.

19. A UE for a multiple input/multiple output (MIMO) wireless communication system, said UE comprising:
    a memory; and
    a processor connected to the memory configured to perform the steps of:
    for a matrix of channels comprising a link between a gNB and a UE, determine correlation values for all DFT-vectors comprising said channel matrix in one or more selected vector directions based on observations of the channel matrix;
    select the DFT vectors in at least one of said selected vector directions having a correlation value greater than a predefined threshold to thereby identify a subset of all DFT vectors; and
    determine said CSI from the selected subset of DFT vectors.

20. A gNB for a multiple input/multiple output (MIMO) wireless communication system, said gNB comprising:
    a memory; and
    a processor connected to the memory configured to:
    send a set of CSI-reference signals (RSs) to a user equipment (UE); and
    receive from said UE a CSI determined from a subset of all DFT vectors from a matrix of channels for said set of CSI-RSs comprising a link between the gNB and the UE.

* * * * *